United States Patent
Bhatia et al.

(10) Patent No.: US 7,307,669 B2
(45) Date of Patent: Dec. 11, 2007

(54) SYSTEM, METHOD, AND APPARATUS FOR DISPLAYING STREAMS WITH DYNAMICALLY CHANGING FORMATS

(75) Inventors: Sandeep Bhatia, Karnataka (IN); Srilakshmi Dorarajulu, Karnataka (IN); Srinivasa MPR, Karnataka (IN); Mahadhevan Sivagururaman, Tamil nadu (IN)

(73) Assignee: Broadcom Corporation, Irvine, CA (US)

( * ) Notice: Subject to any disclaimer, the term of this patent is extended or adjusted under 35 U.S.C. 154(b) by 476 days.

(21) Appl. No.: 10/602,387

(22) Filed: Jun. 24, 2003

(65) Prior Publication Data

US 2005/0013586 A1    Jan. 20, 2005

(51) Int. Cl.
*H04N 5/45* (2006.01)
*H04N 5/46* (2006.01)
*H04N 5/91* (2006.01)
*H04N 5/445* (2006.01)
*H04N 5/455* (2006.01)
*H04N 7/01* (2006.01)
*H04N 9/74* (2006.01)

(52) U.S. Cl. ............. 348/581; 348/555; 348/556; 348/564; 348/565; 348/567; 348/725; 348/726; 348/714; 348/715; 386/131

(58) Field of Classification Search .......... 348/581, 348/555, 556, 564–567, 725–727; 386/131
See application file for complete search history.

(56) References Cited

U.S. PATENT DOCUMENTS

| | | | | |
|---|---|---|---|---|
| 5,760,784 A | * | 6/1998 | Bullis et al. | 345/660 |
| 5,990,958 A | * | 11/1999 | Bheda et al. | 348/407.1 |
| 6,204,887 B1 | * | 3/2001 | Hiroi | 348/565 |
| 6,437,787 B1 | * | 8/2002 | Wu | 345/519 |
| 6,614,441 B1 | * | 9/2003 | Jiang et al. | 345/539 |
| 6,710,817 B2 | * | 3/2004 | Oku et al. | 348/569 |
| 6,781,601 B2 | * | 8/2004 | Cheung | 345/629 |
| 6,996,174 B2 | * | 2/2006 | Campisano et al. | 375/240.13 |
| 7,046,302 B2 | * | 5/2006 | Konuma | 348/558 |
| 7,151,800 B1 | * | 12/2006 | Luna et al. | 375/240.23 |
| 2003/0002584 A1 | * | 1/2003 | Campisano et al. | 375/240.21 |
| 2003/0201836 A1 | * | 10/2003 | Schoner | 331/18 |
| 2004/0208245 A1 | * | 10/2004 | MacInnis et al. | 375/240.15 |

* cited by examiner

*Primary Examiner*—Brian P. Yenke
(74) *Attorney, Agent, or Firm*—McAndrews Held & Malloy Ltd.

(57) ABSTRACT

A system and method for displaying frames with dynamically changing display parameters is described herein. The display engine stores new display parameters detected by the decoder in one buffer of a ping pong buffer, while continuing to use another set of display parameters stored in the other ping pong buffer. The display engine switches the buffers when the first frame for which the new display parameters are applicable is to be presented.

5 Claims, 7 Drawing Sheets

SYSTEM, METHOD, AND APPARATUS FOR DISPLAYING STREAMS WITH DYNAMICALLY CHANGING FORMATS

RELATED APPLICATIONS

Not Applicable

FEDERALLY SPONSORED RESEARCH OR DEVELOPMENT

Not Applicable

MICROFICHE/COPYRIGHT REFERENCE

Not Applicable

BACKGROUND OF THE INVENTION

MPEG-2 is a standard for encoding and compressing of video data. Video data comprises a series of frames. In a progressive scan, the frames represent instantaneous images, while in an interlaced scan, the frames comprise two fields, each of which represents a portion of an image at adjacent times. An MPEG-2 encoder uses a variety of techniques that take advantage of spatial and temporal redundancies in the video data to compress each frame, thereby resulting in data structures known as pictures. The pictures are then grouped together in a set of groups. The groups of pictures form what is known as a video sequence. The video sequence begins with a sequence start code followed by a sequence header, and terminates with a sequence end code. Any number of sequence headers can be placed throughout the video sequence to allow decoding entry points. The video sequences together form what is known as the video elementary stream.

The video elementary stream is packetized, multiplexed, and transmitted to an MPEG-2 decoder. The MPEG-2 decoder recovers the original video sequence for display on a monitor. MPEG-2 decoders include, among other features, a video decoder and a display engine. The video decoder decodes and decompresses the video elementary stream, and provides decoded frames to the display engine. The display engine is responsible for scaling the video picture, rendering the graphics, and constructing the complete display, among other functions. Once the display is ready to be displayed, it is converted to analog video and provided to a monitor.

The video elementary stream can include video data from a variety of sources. Additionally, the video data can be formatted in a variety of different ways. For example, the video data can include standard television sized frames followed by frames in wide screen format. The size and format of the frames are indicated by scaling parameters stored in the video sequence headers. The sequence headers specify the horizontal and vertical size of the pictures, the aspect ratio, the chroma subsampling format, the picture rate, the use of progressive scan or interlace, level, and bit rate, and the quantizing matrices used in intra and inter-coded pictures.

As noted above, the display engine is responsible for scaling the pictures. The display engine includes a scalar for sizing the pictures. The scalar includes registers which indicate the horizontal and vertical size of the frames to be displayed. As the video decoder decodes the frames, the video decoder examines the horizontal and vertical size parameters to detect any changes. Upon detecting a change in the horizontal and/or vertical size parameters, the video decoder signals the scalar to scale up or scale down as the case may be. The signal indicating the scale up or scale down arrives at the scalar shortly after the decoding time for the applicable frame. However, there is a variable time lag between decode time and the time the decoded frame is received at the display engine. As a result, the display engine during the time lag, displays the frames with the new horizontal and vertical size.

Further limitations and disadvantages of conventional and traditional approaches will become apparent to one of skill in the art, through comparison of such systems with the present invention as set forth in the remainder of the present application with reference to the drawings.

BRIEF SUMMARY OF THE INVENTION

Presented herein is a system, method, and apparatus for displaying streams with dynamically changing formats. In one embodiment, responsive to detecting a change in display parameters, the new parameters indicating the change are buffered. The pictures to be displayed are displayed according to old display parameters. Responsive to decoding the picture associated with the new parameters, the new parameters are applied to the displayed pictures.

In another embodiment, a circuit is presented comprising a video decoder for decoding pictures and detecting changes in the horizontal and/or vertical size of the pictures. Upon detecting the changes in the horizontal and/or vertical sizes of the pictures, the video decoder transmits the new horizontal and/or vertical sizes to a display engine. The display engine includes a ping-pong buffer for storing new horizontal and/or vertical sizes and the old horizontal and/or vertical sizes. The display engine stores the new horizontal and/or vertical sizes in one of the ping-pong buffers and applies the old horizontal and/or vertical size parameters to the displayed frames. The display transmits a vertical synchronization pulse that is detected by the decoder system immediately when a new picture is to be displayed. At a predetermined period of time before the vertical synchronization pulse for the first picture on which the new horizontal and/or vertical size parameters are to be applied, a virtual vertical synchronization pulse handler swaps the ping-pong buffer.

In another embodiment, a host processor receives a signal indicating a change in display parameters. The host processor executes a vertical synchronization pulse handler in response to a vertical synchronization pulse. In the presence of the signal indicating a change in display parameters, the vertical synchronization pulse handler sets a clock to a predetermined period of time. When the predetermined period of time expires, the clock interrupts the host processor, causing the host processor to execute a subroutine. The subroutine examines timing information associated with the new display parameters to a time reference. When the time reference is within a certain range, such as the period of time required to display one frame, the subroutine transmits a signal indicating that the new display parameters are to be applied.

These and other advantages and novel features of the present invention, as well as details of illustrated embodiments thereof, will be more fully understood from the following description and drawings.

DETAILED DESCRIPTION OF THE INVENTION

Figure 1:
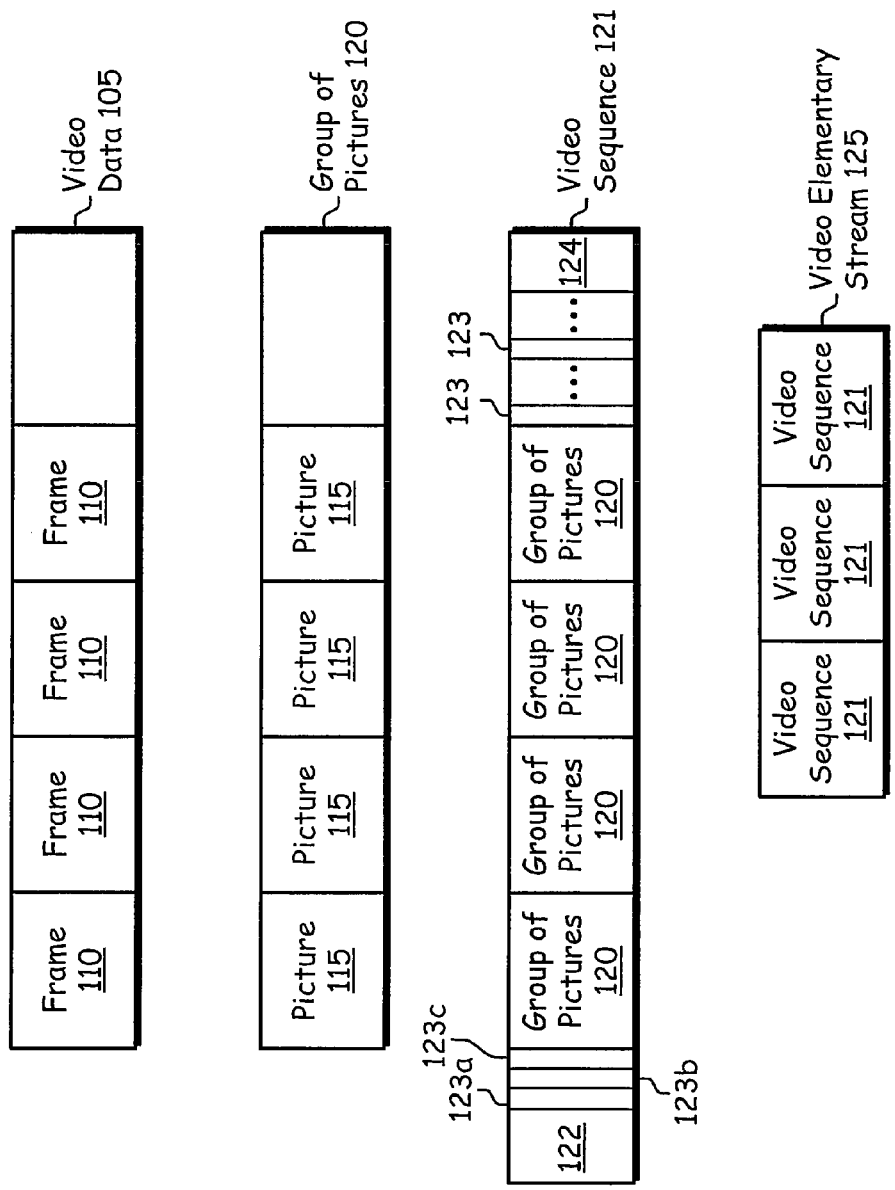
FIG. 1 is a block diagram of an exemplary video stream with dynamically changing display parameters.

Referring now to FIG. 1, there is illustrated a block diagram describing MPEG formatting of a video data 105. The video data 105 comprises a series of frames 110. In a progressive scan, the frames 110 represent instantaneous images, while in an interlaced scan, the frames 110 comprise two fields each of which represent a portion of an image at adjacent times. Each frame is represented by a data structure known as a picture 115. The pictures 115 are then grouped together as a group of pictures 120.

The groups of pictures 120 form what is known as a video sequence 121. The video sequence begins with a sequence start code 122 followed by a sequence header 123, and terminates with a sequence end code 124. Any number of sequence headers 123 can be placed throughout the video sequence to allow decoding entry points.

The sequence headers 123 include parameters 123a that specify the horizontal and vertical size of the pictures, the aspect ratio, the chroma subsampling format, the picture rate, the use of progressive scan or interlace, level, and bit rate, and the quantizing matrices used in intra and inter-coded pictures. The parameter names are:

[Horizontal size, Vertical size, Aspect ratio, Frame rate, Bit rate, optionally Video verifier buffer size and quantizer matrix if applicable.]

The video sequences 121 together form what is known as a video elementary stream 125. The video elementary stream 125 can include video data from a variety of sources. Additionally, the video data can be formatted in a variety of different ways. For example, the video data can include standard television sized frames followed by frames in wide screen format. The size and format of the frames are indicated by display parameters stored in the video sequence headers. The video elementary stream is packetized, multiplexed, and transmitted to an MPEG-2 decoder. The MPEG-2 decoder recovers the original video sequence for display on a monitor. While MPEG-2 is discussed, other encoding formats are also possible (e.g., MPEG-4 Part 10, Advanced Video Coding) and are contemplated by and within the scope of the present invention.

Figure 2:
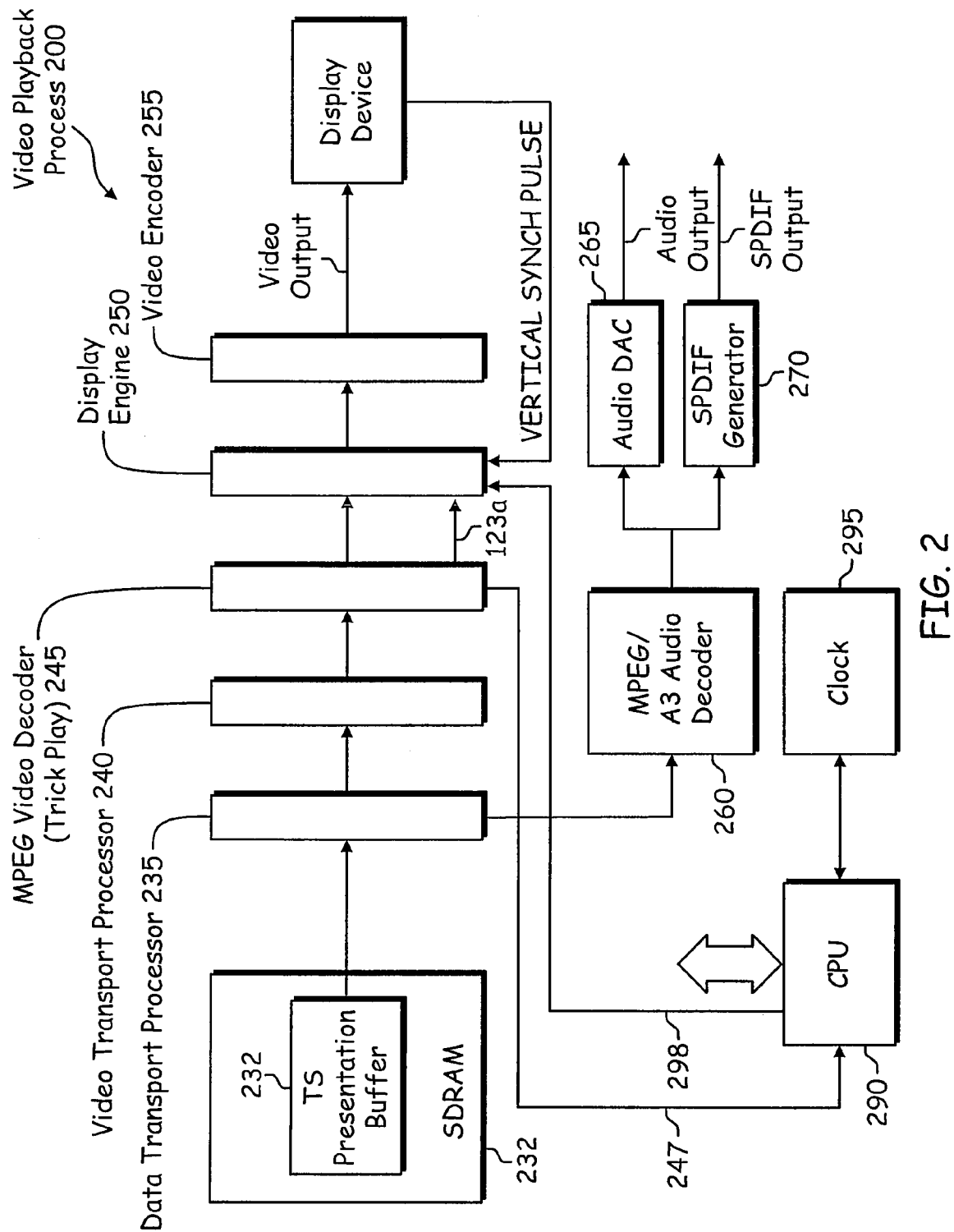
FIG. 2 is a block diagram of an exemplary circuit in accordance with an embodiment of the present invention.

Referring now to FIG. 2, there is illustrated a block diagram of an exemplary circuit in accordance with an embodiment of the present invention. Data is output from a presentation buffer 232 within SDRAM 230. The data output from the presentation buffer 232 is then passed to a data transport processor 235. The data transport processor 235 demultiplexes the transport stream into packetized elementary stream constituents, and passes the audio transport stream to an audio decoder 260 and the video transport stream to a video transport decoder 240.

The video transport decoder 240 converts the video transport stream to a video elementary stream 125. The video elementary stream 125 is received by a video decoder 245. The video decoder 245 decompresses the video elementary stream 125, and recovers the frames 110. The video decoder 245 stores the decoded frames 110 in frame buffers.

A display engine 250 retrieves the frames from the frame buffers and scales the frames, renders the graphics, and constructs the complete display according to the display parameters 124 associated with the frames 110. Once the display is ready to be presented, it is passed to a video encoder 255 where it is converted to analog video using an internal digital to analog converter (DAC) and transmitted to the display device. The display device indicates the time for displaying a new frame by transmitting a vertical synchronization pulse. Responsive to the vertical synchronization pulse, the circuit provides the next frame for display. The vertical synchronization pulse generates an interrupt to the host processor 290 causing the host processor 290 to execute a vertical synchronization pulse handler. The digital audio is converted to analog in an audio digital to analog (DAC) 265.

Changes in the display parameters 123a are detected by the video decoder 245. The video decoder 245 parses the sequence headers 123 in the video elementary stream 125 and examines the display parameters 123a. When a change in the display parameters occurs 124, the decoder 245 provides the new display parameters 123a to the display engine 250. The decoder 245 also provides timing information indicating the time the new display parameters are to be applied. The timing information can include, for example, the presentation time stamp associated with the first frame of the video sequence 121. Additionally, the decoder 245 transmits a signal 247 indicating the changed display parameters to the host processor 290.

The display engine 250 scales and renders the frames based on the display parameters 123a provided by the video decoder 245. However, there is a time lag between the time the new display parameters 123a are sent and the time for displaying the first frame with the new display parameters 123a. The time lag is caused by the processing time for the video decoder 245 as well as the fact that in MPEG-2, frames can be decoded and displayed at different times.

Accordingly, the old display parameters are applicable during the time lag. Therefore, during the time lag, the display engine 250 stores the new display parameters but scales the frames according the old display parameters.

The switch from the old display parameters to the new display parameters is caused by transmission of a signal from the host processor 290. The host processor 290 executes a subroutine at a predetermined period of time prior to each vertical synchronization pulse. The vertical synchronization pulse interrupts the host processor 290, causing the host processor 290 to execute a vertical synchronization pulse handler.

When signal 247 is asserted, the vertical synchronization pulse handler sets a clock 295 with a time period. The time period is selected to occur at an arbitrary time period prior to the next vertical synchronization pulse. Expiration of the clock 295 interrupts the host processor 290, causing the host processor 290 to execute a subroutine. The subroutine detects the time for displaying the frames with the new display parameters by comparing the timing information to the reference time. At the time the new display parameters are to be applied, the host processor 290 signals 298 the display engine 250 to switch from the old display parameters to the new display parameters.

Figure 3:
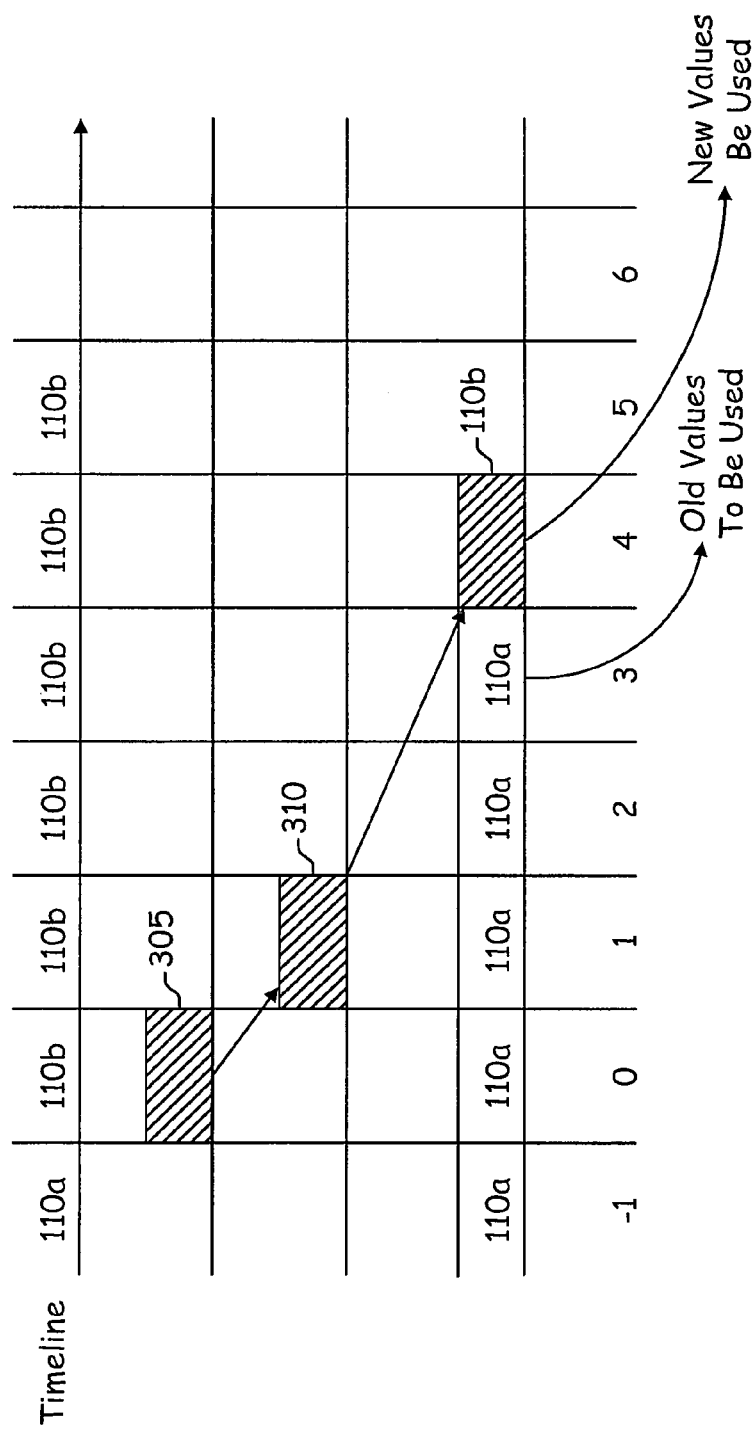
FIG. 3 is a timing diagram describing the operation of the video display engine in accordance with an embodiment of the present invention.

Referring now to FIG. 3, there is illustrated an exemplary timing diagram describing the operation of the display engine 250, for example, in accordance with an embodiment of the present invention. Prior to time t=0, the video decoder 245 decodes an old set of frames 110a, associated with old display parameters. At time t=0, the decoder 245 starts decoding a new set of frames 110b, associated with new display parameters. Upon detecting the new display parameters at the start of decoding new frames 110b, the video decoder 245 detects and sends (305) the new display parameters 123a to the display engine 250. The display engine receives and stores (310) the new display parameters at t=1.

There is a time lag between the time the new display parameters 123a are sent, e.g., t=0, and the time for displaying the new set of frames 110b with the new display parameters 123a, e.g., t=4. During the time lag, t=1, 2, 3, the display engine 250 scales the old set of frames 110a. The old set of frames 110a are associated with the old display parameters 123a. Accordingly, although the display engine 250 stores the new display parameters at t=1, the display engine 250 continues to scale the old frames 110a according the old display parameters until t=4. At t=4, the display engine 250 begins scaling the new frames 110b according to the new display parameters 123a.

Figure 4:
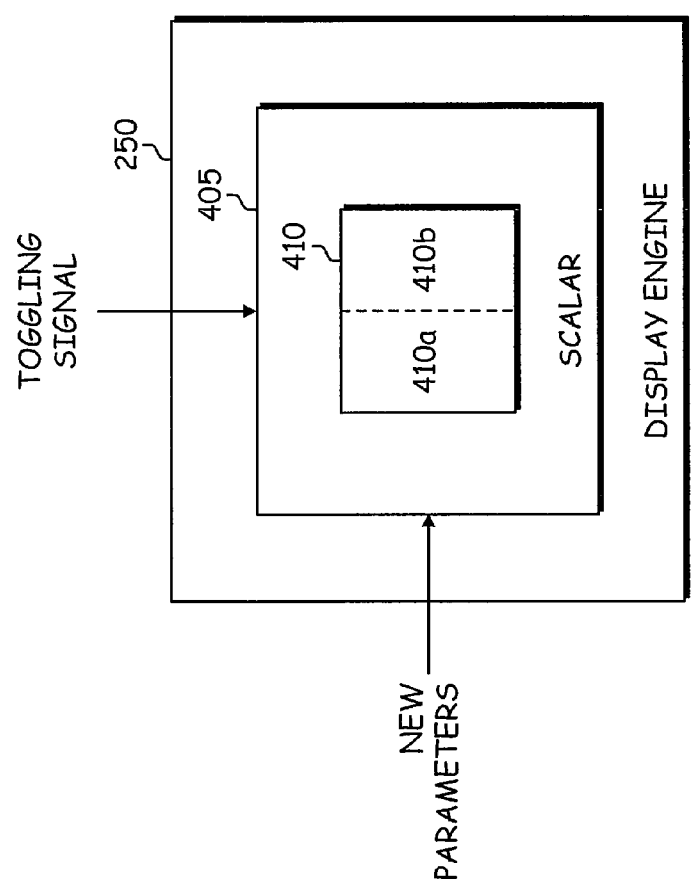
FIG. 4 is a block diagram of an exemplary video display engine in accordance with an embodiment of the present invention.

Referring now to FIG. 4, there is illustrated a block diagram of an exemplary decoder engine 250 according to an embodiment of the present invention. The display engine 250 comprises a scalar 405 for scaling frames 110. The scaling frames 110 include an old set of frames 110a, and a new set of frames 110b. The scalar 405 scales incoming frames according to display parameters stored in a ping pong buffer 410.

The ping pong buffer 410 comprises two buffers 410a, 410b. Each of the buffers 410a, 410b are capable of storing a set of display parameters 123a and associated timing information. The scalar 405 scales the frames 110 accordingly to the display parameters 123a stored in one of the buffers 410a, 410b of the ping-pong buffer. The particular one of the buffers 410a, 410b storing the display parameters 123a used by the scalar 405 is determined by a toggling signal 415. Responsive to receiving a toggling signal 415, the scalar 405 switches using the display parameters 123a from one of the buffers 410a, 410b to the other. For example, if the scalar 405 uses the display parameters 123a from buffer 410a, upon receiving a toggling signal 415, the scalar 405 uses the display parameters 123a from buffer 410b.

The display engine 250 scales the old set of frames 110 with the old display parameters and scales the new set of frames with the new display parameters. While the display engine 250 scales the old set of frames 110a, the old parameters are stored in one of the buffers, e.g., buffer 410a. When the decoder 245 begins decoding the new frames 110b, the decoder 245 detects the new display parameters 123a and transmits the new display parameters to the display engine 250. The display engine 250 stores the new display parameters in the opposite buffer, e.g., buffer 410b, from the buffer 410a storing the old display parameters 123a.

There is a time lag between the time the new display parameters 123a are sent and the time for displaying the new set of frames 110b with the new display parameters 123a. During the time lag, the display engine 250 scales the old set of frames 110a. The old set of frames 110a are associated with the old display parameters 123a stored in the buffer 410a. Accordingly, although the display engine 250 stores the new display parameters in buffer 410b, the display engine 250 continues to scale the old frames 110a according the old display parameters stored in buffer 410a.

After the time lag, the display engine 250 begins scaling the new frames 110b according to the new display parameters 123a stored in buffer 410b. The scalar 405 switches display parameters from the buffer 410a to the buffer 410b responsive to receiving the toggling signal 415. The toggling signal 415 is transmitted at the time when the new set of frames 110a are received and scaled by the display engine 250.

Figure 5:
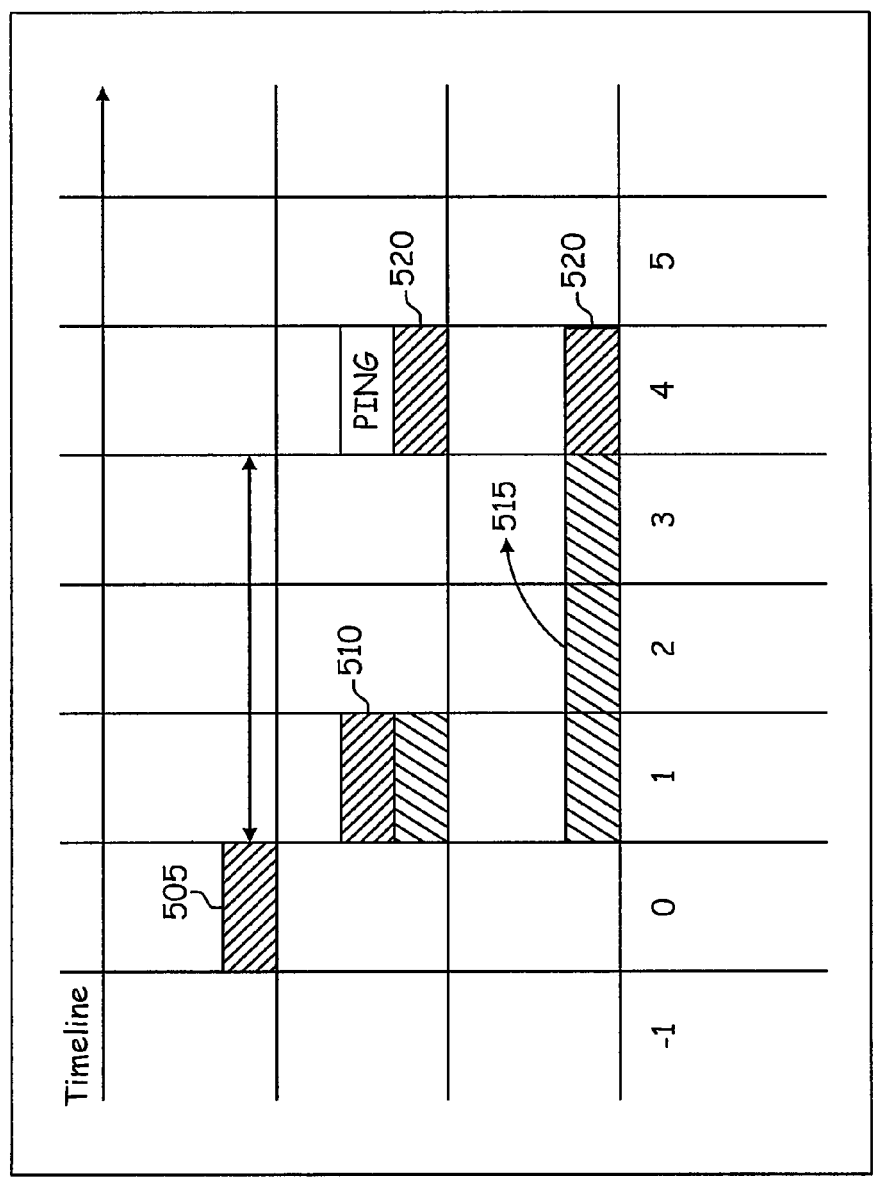
FIG. 5 is a block diagram describing the operation of the scalar in accordance with an embodiment of the present invention.

Referring now to FIG. 5, there is illustrated a timing diagram describing the operation of the scalar in accordance with an embodiment of the present invention. Prior to time t=0, the video decoder 245 decodes an old set of frames 110a, associated with old display parameters, while the display engine 250 scales the old set of frames 110a with the old display parameters 123a stored in buffer 410a. At time t=0, the decoder 245 starts decoding a new set of frames 110b, associated with new display parameters. Upon detecting the new display parameters at the start of decoding new frames 110b, the video decoder 245 detects and sends (505) the new display parameters 123a to the display engine 250. The display engine receives and stores (510) the new display parameters in the buffer opposite the buffer storing the old display parameters 123a, buffer 410b, at t=1.

There is a time lag between the time the new display parameters 123a are sent, e.g., t=0, and the time for displaying the new set of frames 110b with the new display parameters 123a, e.g., t=4. During the time lag, t=1,2,3, the display engine 250 scales (515) the old set of frames 110a, using the old display parameters stored in buffer 410a. At t=4, the scalar 305 switches (520) from using the old display parameters from buffer 410a to the new display parameters stored in buffer 410b.

The determination of the timing for the toggling signal 415 is indicated by timing information associated with the new display parameters 123a. The timing information can comprise, for example, a presentation time stamp associated with the first one of the new frames 110b. Detection of scaling the new frames 110b by the decoder engine 250 can occur by comparing a reference time with the timing information associated with the new display parameters 123a. When the reference time and the timing information associated with the new display parameters 123a are within the time period for displaying one frame.

The comparison preferably occurs at least the frequency the frames 110 are displayed. Accordingly, the comparison can be synchronized with the vertical synchronization pulse. However, if the toggling signal 415 is sent at the vertical synchronization pulse immediately before presentation of the first of the new frames 110b, the change may take effect only after the subsequent vertical synchronization pulse, thereby causing the first frame of the new frames 110b to be displayed with the old display parameters 123a. The foregoing results in a undesirable apparent visual artifact.

The pulse is preferably qualified with the vertical synchronization pulse to enable the scalar 410 to switch the buffers 410a, 410b. Accordingly, a subroutine executed by the host processor 290 compares the reference time with the timing information associated with the new display parameters 123a, and transmits the toggling signal 415 if the timing information and the reference time is within the time period of one frame. The subroutine can be invoked at an arbitrary time before the virtual synchronization pulse immediately prior to the first of the new frames 110b. The arbitrary period is preferably long enough for the subroutine to fully execute prior to the vertical synchronization pulse.

Additionally, it is noted there is a period of time known as the blanking period that occurs between completion of the display of a frame and the subsequent vertical synchronization pulse. The arbitrary period is preferably selected such that the subroutine is executed during the blanking period.

Figure 6:
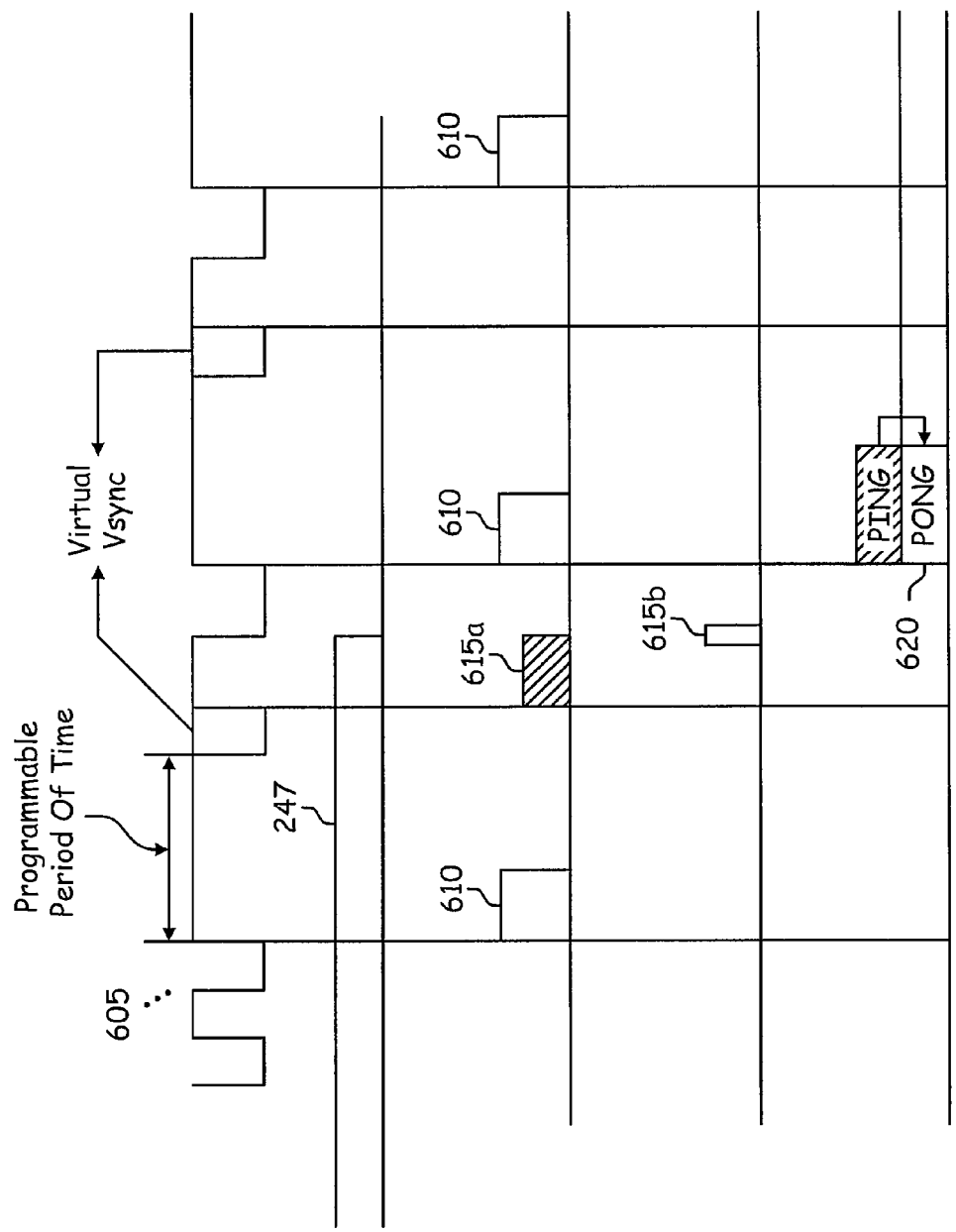
FIG. 6 is a timing diagram describing the operation of the processor in accordance with an embodiment of the present invention.

Referring now to FIG. 6, there is illustrated a timing diagram describing the operation of the host processor 290, for example, in accordance with an embodiment of the present invention. As noted above, the display device transmits a vertical synchronization pulse 605 indicating the starting time for displaying a frame. The vertical synchronization pulse 605 interrupts the host processor 290, causing the host processor 290 to invoke a vertical synchronization pulse handler 610. In the presence of signal 247, the vertical synchronization pulse handler sets a clock 295 with a predetermined period of time. The predetermined period of time is selected to expire during the next blanking period. The expiration of the clock 295 interrupts the host processor 290 causing the host processor 290 to execute a subroutine 615. The subroutine 615 compares 615a the timing information associated with any new display parameters 123a with the reference time. Wherein the timing information and the reference time are within the time period for displaying one frame, the subroutine causes the host processor 290 to transmit 615b the toggling signal 415 to the display engine 250. The toggling signal 415 causes the scalar to switch from the old display parameters to the new display parameters and use the new display parameters 123(a) for scaling.

Figure 7:
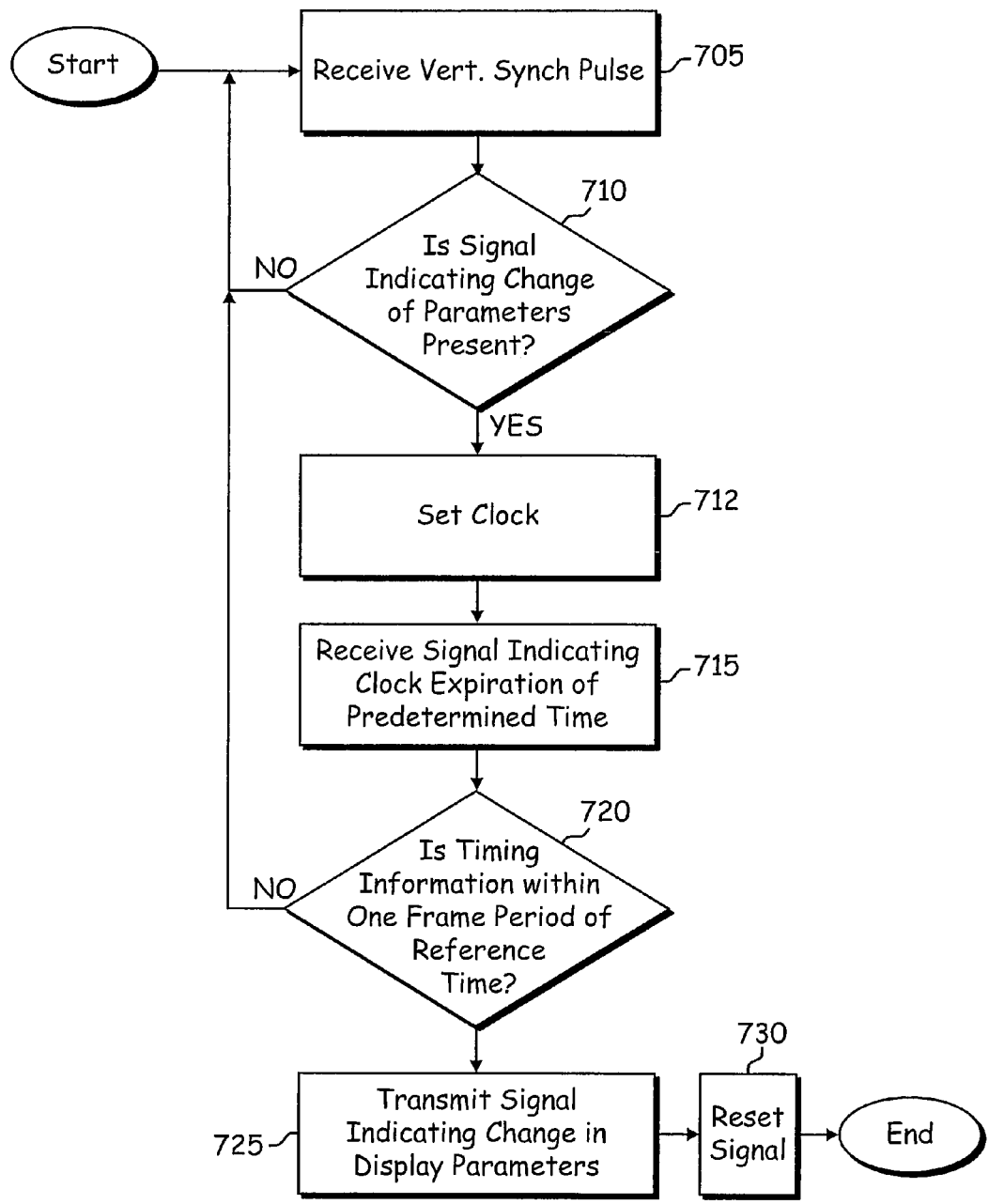
FIG. 7 is a flow diagram for applying dynamically changing video display parameters in accordance with an embodiment of the present invention.

Referring now to FIG. 7, there is illustrated a flow diagram for transmitting a signal at the time the new display parameters are applicable, during a change from old display parameters to new display parameters. At 705, the host processor 290 receives a vertical synchronization pulse from the display device. Responsive thereto, the host processor 290 determines at 710 whether a signal 247 indicating a change of display parameters 123a is present. If at 710, the signal 247 indicating a change of display parameters is not present, the host processor 290 returns to 705. If at 710, the signal 247 indicating a change of display parameters 123a is present, the host processor 290 sets (712) a clock 295 with a predetermined period of time. At the expiration of the predetermined period of time, the host processor 290 receives (715) a signal from the clock indicating the expiration of the predetermined period of time. Responsive thereto, the host processor 290 compares (720) the reference time and timing information associated with new display parameters 123a stored in one of the buffers 410 in the scalar 405.

If during 720, the reference time and the timing information are within the time period required to display one frame, the host processor 290 transmits (725) a signal indicating that the new display parameters 123a are to be used by the display engine 250. At 730, the host processor 290 resets the signal 247 indicating a change in display parameters, and the process is terminated. If during 725, the reference time and the timing information are not within the time period required to display one frame, the host processor 290 returns to 705.

The embodiments described herein may be implemented as a board level product, as a single chip, application specific integrated circuit (ASIC), or with varying levels of the decoder system integrated with other portions of the system as separate components. The degree of integration of the decoder system will primarily be determined by the speed and cost considerations. Because of the sophisticated nature of modern processor, it is possible to utilize a commercially available processor, which may be implemented external to an ASIC implementation. Alternatively, if the processor is available as an ASIC core or logic block, then the commercially available processor can be implemented as part of an ASIC device wherein certain functions can be implemented in firmware.

While the invention has been described with reference to certain embodiments, it will be understood by those skilled in the art that various changes may be made and equivalents may be substituted without departing from the scope of the invention. In addition, many modifications may be made to adapt particular situation or material to the teachings of the invention without departing from its scope. Therefore, it is intended that the invention not be limited to the particular embodiment(s) disclosed, but that the invention will include all embodiments falling within the scope of the appended claims.

The invention claimed is:

1. A system for providing a video signal comprising scaled frames, said system comprising:
    a decoder for decoding a plurality of frames, wherein the plurality of frames comprises a first one or more frames associated with old display parameters, and a second one or more frames associated with new display parameters, and transmitting a signal after receiving the second one or more frames;
    a display engine for scaling the first one or more frames associated with the old display parameters after receiving the signal from the decoder;
    a controller for setting a timer with a predetermined period of time responsive to a vertical synchronization signal, comparing timing data associated with the new display parameters to a time reference, after the expiration of the predetermined period of time and transmitting another signal to the display engine if the timing data associated with the new display parameters is within a predetermined range from the timing reference; and
    wherein the display engine scales the second one or more frames with the new display parameters, after receiving the another signal from the controller.

2. The system of claim 1, wherein the signal from the decoder to the display engine provides the new display parameters to the display engine.

3. The system of claim 1, wherein the display engine further comprises:
    a first buffer for storing the old parameters; and
    a second buffer for storing the new parameters.

4. The system of claim 1, wherein the timing data further comprises a presentation time stamp.

5. The system of claim 1, wherein the new display parameters are stored in a sequence header.

* * * * *